(12) United States Patent
Yoon et al.

(10) Patent No.: US 10,248,588 B2
(45) Date of Patent: Apr. 2, 2019

(54) FRAME RECEPTION MONITORING METHOD IN SERIAL COMMUNICATIONS

(71) Applicant: LSIS CO., LTD., Gyeonggi-do (KR)

(72) Inventors: Geon Yoon, Gyeonggi-do (KR); Ki-Myung Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 247 days.

(21) Appl. No.: 15/354,166

(22) Filed: Nov. 17, 2016

(65) Prior Publication Data
US 2018/0095907 A1    Apr. 5, 2018

(30) Foreign Application Priority Data

Oct. 4, 2016   (KR) ........................ 10-2016-0000558

(51) Int. Cl.
| G06F 13/00 | (2006.01) |
| G06F 13/16 | (2006.01) |
| H04L 12/801 | (2013.01) |
| H04L 12/861 | (2013.01) |
| G06F 13/42 | (2006.01) |

(52) U.S. Cl.
CPC ...... *G06F 13/1673* (2013.01); *G06F 13/4282* (2013.01); *H04L 47/34* (2013.01); *H04L 49/9057* (2013.01)

(58) Field of Classification Search
CPC .................................................. G06F 13/1673
See application file for complete search history.

(56) References Cited

U.S. PATENT DOCUMENTS

| 5,469,545 A * | 11/1995 | Vanbuskirk ......... G06F 13/4022 370/235 |
| 5,619,681 A | 4/1997 | Benhamida et al. |
| 5,717,870 A | 2/1998 | Dobson |
| 8,458,364 B2 * | 6/2013 | Alankry ................ H04J 3/0697 702/178 |

FOREIGN PATENT DOCUMENTS

| JP | H0242837 A | 2/1990 |
| JP | 3421191 B2 | 6/2003 |
| JP | 2004351551 A | 12/2004 |
| JP | 3637029 B2 | 4/2005 |

(Continued)

OTHER PUBLICATIONS

European Search Reports dated Apr. 7, 2017 in connection with the counterpart European Patent Application No. 16195531.5.

(Continued)

*Primary Examiner* — Tammara R Peyton
(74) *Attorney, Agent, or Firm* — K&L Gates LLP

(57) ABSTRACT

The present disclosure relates to a frame reception monitoring method, including: when a plurality of sub-frames constituting a frame is each entered into a reception buffer at certain time intervals, allowing the respective sub-frames to be stored on a temporal buffer; allowing the plurality of sub-frames stored on the temporal buffer to be entered into a service buffer within a predetermined inter-sub-frames time-out time; using the plurality of sub-frames entered into the service buffer to generate a combined frame; and using the combined frame to execute a control.

9 Claims, 8 Drawing Sheets

(56) References Cited

FOREIGN PATENT DOCUMENTS

| | | | |
|---|---|---|---|
| JP | 3837857 | B2 | 10/2006 |
| JP | 4762999 | B2 | 8/2011 |
| JP | 2012100012 | A | 5/2012 |
| JP | 2014519107 | A | 8/2014 |
| KR | 1020050055919 | A | 6/2005 |
| KR | 1020110084674 | A | 7/2011 |
| KR | 1020140046052 | A | 4/2014 |
| KR | 101434422 | B1 | 8/2014 |

OTHER PUBLICATIONS

Korean Office Action dated Jul. 3, 2017 corresponding to application No. 10-2016-0000558.
Japanese Office Action for related Japanese Application No. 2016-221888; action dated Nov. 7, 2017; (3 pages).

* cited by examiner

PRIOR ART

FRAME RECEPTION MONITORING METHOD IN SERIAL COMMUNICATIONS

CROSS REFERENCE TO RELATED APPLICATION

This application claims the benefit of Korean Patent Application No. 10-2016-0000558, filed on Jan. 4, 2016, entitled "METHOD OF MONITORING FRAME RECEIVING IN SERIAL COMMUNICATION", which is hereby incorporated by reference in its entirety into this application.

BACKGROUND

1. Technical Field

Embodiments of the present disclosure relate to a frame reception monitoring method in serial communications.

2. Description of the Related Art

In serial communications, a transmission terminal divides one frame into a plurality of sub-frames to transmit them to a Programmable Logic Controller (PLC) at certain time intervals. At this time, the transmission terminal transmits sub-frames to the PLC through buffers, and the number of sub-frames differs depending on the size of the buffers.

For example, if the number of sub-frames constituting one frame is three (3) and the size of a buffer is three (3), then the transmission terminal may simultaneously transmit the three sub-frames to the PLC through the buffer. In the above case, the transmission terminal may transmit a plurality of, i.e., three, sub-frames at a time to the PLC through the buffer by the size of the buffer, and hence its transmission rate is high. However, a UART controller with which such a buffer is equipped is disadvantageously expensive.

For another example, if the number of sub-frames constituting one frame is three (3) and the size of a buffer is one (1), then the transmission terminal may transmit a first sub-frame to the PLC through the buffer. After completing the transmission of the first sub-frame, it may transmit a second sub-frame to the PLC through the buffer. Then, after completing the transmission of the second sub-frame, it may transmit a third sub-frame to the PLC through the buffer. In the above case, the transmission terminal may transmit a plurality of, i.e., three, sub-frames individually to the PLC through the buffer and hence its transmission rate is low. However, a UART controller with which such a buffer is equipped is advantageously cheap.

Nonetheless, in the above example, there is a problem that the PLC may recognize each of the first, second and third sub-frames to be different frames in case where a difference time between reception times of the first sub-frame and the second sub-frame is not less than a certain time (e.g., 3.5 char time) or a difference time between reception times of the second sub-frame and the third sub-frame is not less than a certain time.

In this case, since the recognized frame is different from a subject frame which is meant to be received, the recognized frame is discarded and as a result a reception process is not done. As such, the PLC has a problem that it is difficult to keep the compatibility and achieve a smooth communication because various types of unit instruments execute transmissions in respective formats.

SUMMARY

It is an aspect of the present disclosure to provide a frame reception monitoring method in serial communications which may assign timestamps to sub-frames received by a transmission terminal at certain time intervals and stores them, so that interval information between reception times of the sub-frames can be calculated using a timestamp of a corresponding sub-frame.

It is another aspect of the present disclosure to provide a frame reception monitoring method in serial communications which may control intervals between sub-frames, which would be recognized to be one frame, according to interval information between reception times of the sub-frames, calculated using the timestamps of the sub-frames, to control a combination of the sub-frames, and therefore, can be in a smooth communication with any types of serial communications instruments.

Other objects of the present disclosure are not limited to the above-described object and other objects and advantages can be appreciated by the following description described with reference to the embodiments of the present disclosure. Further, it will be easily appreciated that the objects and advantages of the present invention can be realized by means and a combination thereof recited in the appended claims.

In accordance with one aspect of the present invention, the frame reception monitoring method in serial communications includes: when a plurality of sub-frames constituting a frame is each entered into a reception buffer at certain time intervals, allowing the respective sub-frames to be stored on a temporal buffer; allowing the plurality of sub-frames stored on the temporal buffer to be entered into a service buffer within a predetermined inter-sub-frames time-out time; using the plurality of sub-frames entered into the service buffer to generate a combined frame; and using the combined frame to execute a control.

As described above, the present disclosure assigns timestamps to sub-frames received by a transmission terminal at certain time intervals and stores them, so that interval information between reception times of the sub-frames can be advantageously calculated using a timestamp of a corresponding sub-frame.

Further, the present disclosure can control intervals between sub-frames, which would be recognized to be one frame, according to interval information between reception times of the sub-frames, calculated using the timestamps of the sub-frames, to control a combination of the sub-frames, and therefore, can advantageously be in a smooth communication with any types of serial communications instruments.

DETAILED DESCRIPTION

Figure 1:
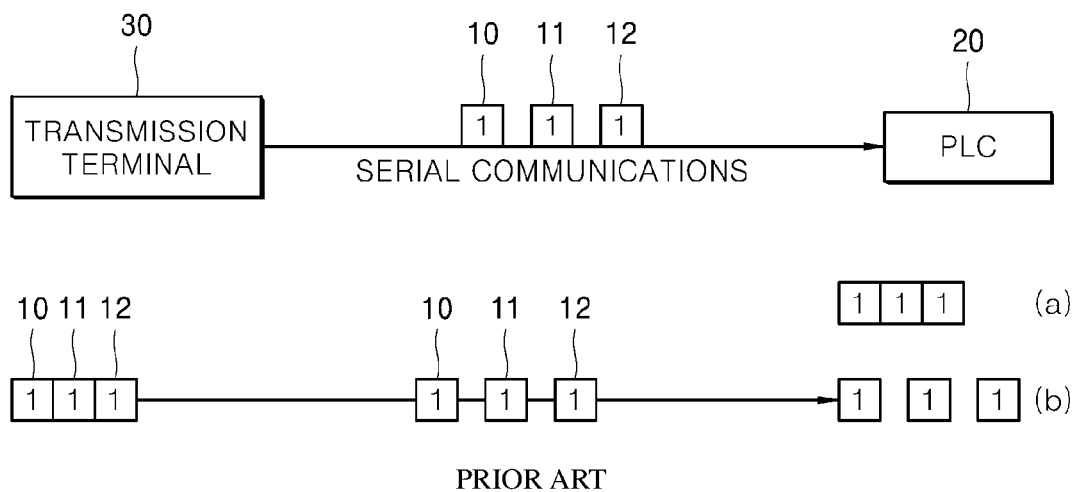
FIG. 1 is a diagram for illustrating frame transmission/reception processes in a UART controller.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 is a diagram for illustrating frame transmission/reception processes in a UART controller.

Referring to FIG. 1, a transmission terminal 30 divides one frame into a plurality of sub-frames to transmit them to a PLC 20 at specific time intervals. At this time, the transmission terminal 30 transmits different numbers of sub-frames to the PLC 20 through a corresponding buffer, the number of sub-frames depending on the size of the corresponding buffer.

For example, if the number of sub-frames constituting one frame is 3 (three) and the size of a buffer is 3 (three), then the transmission terminal 30 may simultaneously transmit the three sub-frames to the PLC 20 through the buffer. In the above case, the transmission terminal 30 may transmit a plurality of, i.e., three, sub-frames at a time to the PLC 20 through the buffer because the size of the buffer is large, and hence its transmission rate is high. However, a UART controller with which such a buffer is equipped is disadvantageously expensive.

For another example, if the number of sub-frames constituting one frame is 3 (three) and the size of a buffer is 1 (one), then the transmission terminal 30 may transmit a first sub-frame to the PLC 20 through the buffer. After completing the transmission of the first sub-frame, it may transmit a second sub-frame to the PLC 20 through the buffer. Then, after completing the transmission of the second sub-frame, it may transmit a third sub-frame to the PLC 20 through the buffer. In the above case, the transmission terminal may transmit a plurality of, i.e., three, sub-frames individually to the PLC 20 through the buffer and hence its transmission rate is low. However, a UART controller with which such a buffer is equipped is advantageously cheap.

Nonetheless, in the above example, there is a problem that the PLC 20 may recognize each of the first, second and third sub-frames to be different frames in case where a difference time between reception times of the first sub-frame and the second sub-frame is not less than a certain time (e.g., 3.5 char time) or a difference time between reception times of the second sub-frame and the third sub-frame is not less than a certain time.

That is, when transmitting each of the first to third sub-frames to the PLC 20 at certain time intervals, the transmission terminal 30 anticipates that the PLC 20 recognizes each of the first, second and third sub-frames to be one frame as in (a) of FIG. 1.

However, when a difference time between reception times of the first sub-frame and the second sub-frame is not less than a certain time or a difference time between reception times of the second sub-frame and the third sub-frame is not less than a certain time, the PLC 20 recognizes each of the first, second and third sub-frames to be different frames as in (b) of FIG. 1.

In this case, since the recognized frame is different from a subject frame which is meant to be received, the recognized frame is discarded and as a result a reception process is not done. As such, the PLC has a problem that it is difficult to keep the compatibility and achieve a smooth communication because various types of unit instruments execute transmissions in respective formats.

Figure 2:
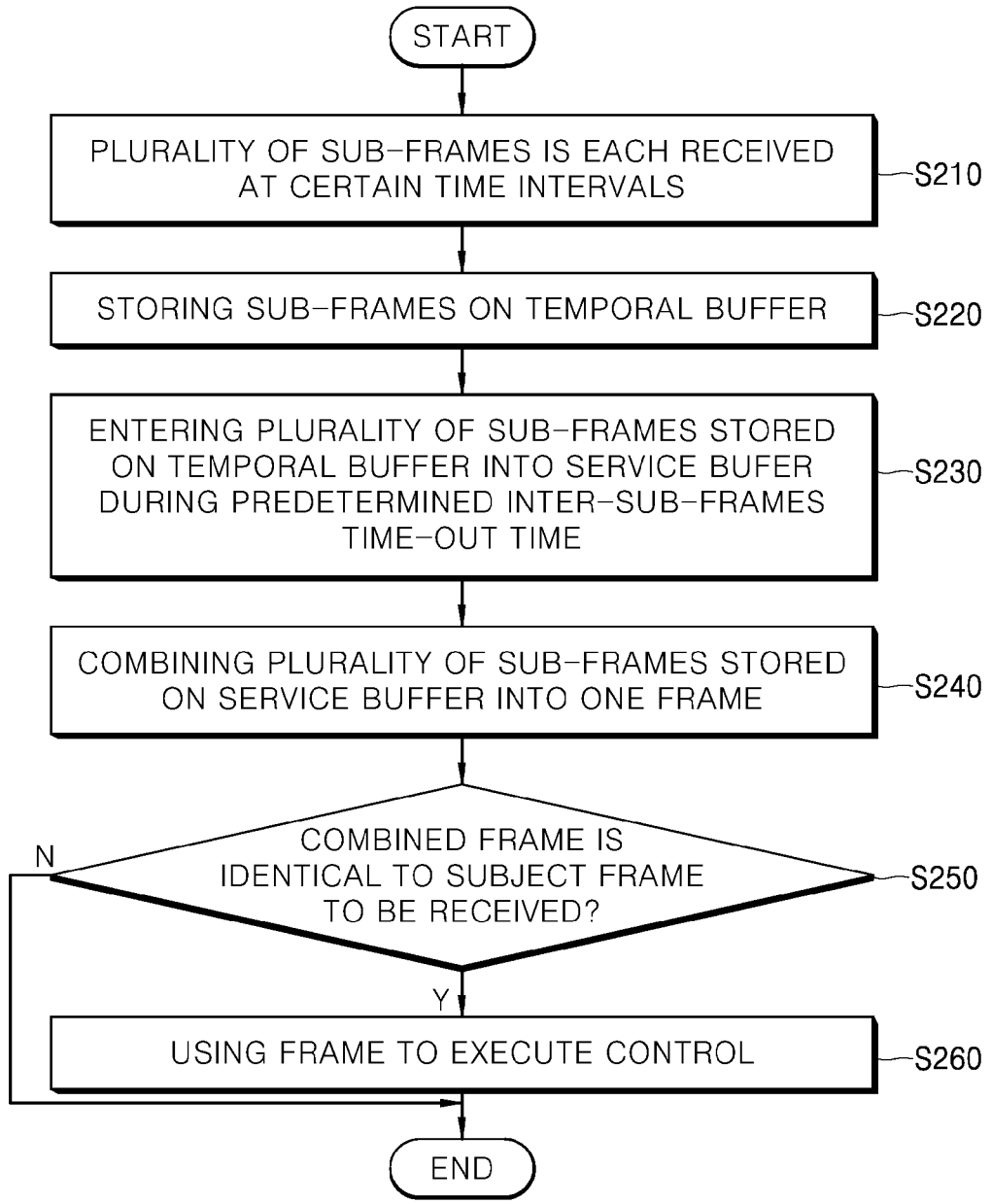
FIG. 2 is a flowchart for illustrating a frame reception monitoring method in serial communications according to one embodiment of the present disclosure.

FIG. 2 is a flowchart for illustrating a frame reception monitoring method in serial communications according to one embodiment of the present disclosure.

Referring to FIG. 2, when a plurality of sub-frames constituting a frame is each entered into a reception buffer at certain time intervals (Step S210), a frame reception monitoring apparatus stores a corresponding sub-frame on a temporal buffer (Step S220).

At this time, the frame reception monitoring apparatus assigns timestamps to the sub-frames and thereafter stores the sub-frames on the temporal buffer when storing the sub-frames entered into the reception buffer on the temporal buffer.

The reason of assigning the timestamps to the sub-frames as described above is to utilize the timestamps assigned to the sub-frames to calculate interval information between reception times of the sub-frames, thereby determining an inter-sub-frames time-out time. The process of determining the inter-sub-frames time-out time will be described below in more detail.

Hereinafter, the process of respectively assigning timestamps to a plurality of sub-frames will be described. When the plurality of sub-frames is received into the reception buffer at certain time intervals, the frame reception monitoring apparatus utilizes time information at reception complete time points of the respective sub-frames, to assign a timestamp to a corresponding sub-frame.

For example, when a second sub-frame of the a plurality of sub-frames is received into the reception buffer, the frame reception monitoring apparatus utilizes time information, 1200 μs, at a reception complete time point of the second sub-frame, to assign a timestamp 1200 μs to the second sub-frame.

The frame reception monitoring apparatus allows the plurality of sub-frames stored on the temporal buffer to be entered into a service buffer during a predetermined inter-sub-frames time-out time (Step S230).

At this time, the reason of previously determining the inter-sub-frames time-out time is to determine a time point when sub-frames transmitted from the transmission terminal can be recognized to be one frame. That is, the inter-sub-frames time-out time is previously determined in order to recognize the first sub-frame to any sub-frames received across certain time points as one frame.

Accordingly, the present disclosure can utilize the predetermined inter-sub-frames time-out time to recognize sub-frames stored on the temporal buffer during a specified time period to be one frame.

However, determining the inter-sub-frames time-out time to be too short may cause the inter-sub-frames time-out time to expire before all of the sub-frames constituting the one frame are stored on the temporal buffer through the reception buffer.

For example, the inter-sub-frames time-out time may expire when sub-frames A, B and C was received although a frame is constituted of sub-frames A, B, C, D and E. In this case, even though the sub-frames A, B and C are used to generate a combined frame, the combined frame is discarded since it is different from a subject frame which is meant to be received.

On the contrary, determining the inter-sub-frames time-out time to be too long may cause all of the sub-frames constituting the one frame to pass through the reception buffer and then are stored on the temporal buffer. However, because the predetermined inter-sub-frames time-out time does not expire yet, this has a problem that it should wait until the predetermined inter-sub-frames time-out time expires.

For example, all of the sub-frames A, B, C, D and E constituting one frame may be received. At this time, if the predetermined inter-sub-frames time-out time is left, then it should wait until the predetermined inter-sub-frames time-out time expires.

Therefore, the present disclosure can utilize interval information between reception times of a plurality of sub-frames constituting one frame to previously determine an inter-sub-frames time-out time, thereby preventing the mentioned-above problem.

Hereinafter, a process of utilizing timestamps of a plurality of sub-frames to calculate interval information between reception times of the sub-frames will be described.

The frame reception monitoring apparatus utilizes time information at a reception complete time point of a first sub-frame of the plurality of sub-frames and time information at a reception start time point of a second sub-frame of the plurality of sub-frames to calculate interval information between reception times of the first sub-frame and the second sub-frame.

At this time, the frame reception monitoring apparatus utilizes a timestamp of the first sub-frame to determine time information at the reception complete time point of the first sub-frame. However, the frame reception monitoring apparatus cannot know the time information at the reception start time point of the second sub-frame. Hence, the frame reception monitoring apparatus utilizes time information at a reception complete time point of the second sub-frame, a length of the second sub-frame, and a communication state to trace back time information at the reception start time point of the second sub-frame.

Then, the frame reception monitoring apparatus may utilize the time information at the reception complete time point of the first sub-frame and the time information at the reception start time point of the second sub-frame as determined by the described-above process, thereby calculating interval information between reception times of the first sub-frame and the second sub-frame.

Interval information between reception times of the plurality of sub-frames may be known by repeatedly performing the foregoing process. Further, combination of sub-frames can be controlled by utilizing such interval information to previously determine an inter-sub-frames time-out time, so that the smooth communication with any types of serial communications instruments can be achieved.

The frame reception monitoring apparatus utilizes a plurality of sub-frames entered into the service buffer to generate the combined frame (Step S240), and checks whether the combined frame is identical to the subject frame meant to be received (Step S250).

In response to the combined frame being identical to the subject frame meant to be received (Step S250), the frame reception monitoring apparatus utilizes the combined frame to execute a control (Step S260).

Figure 3:
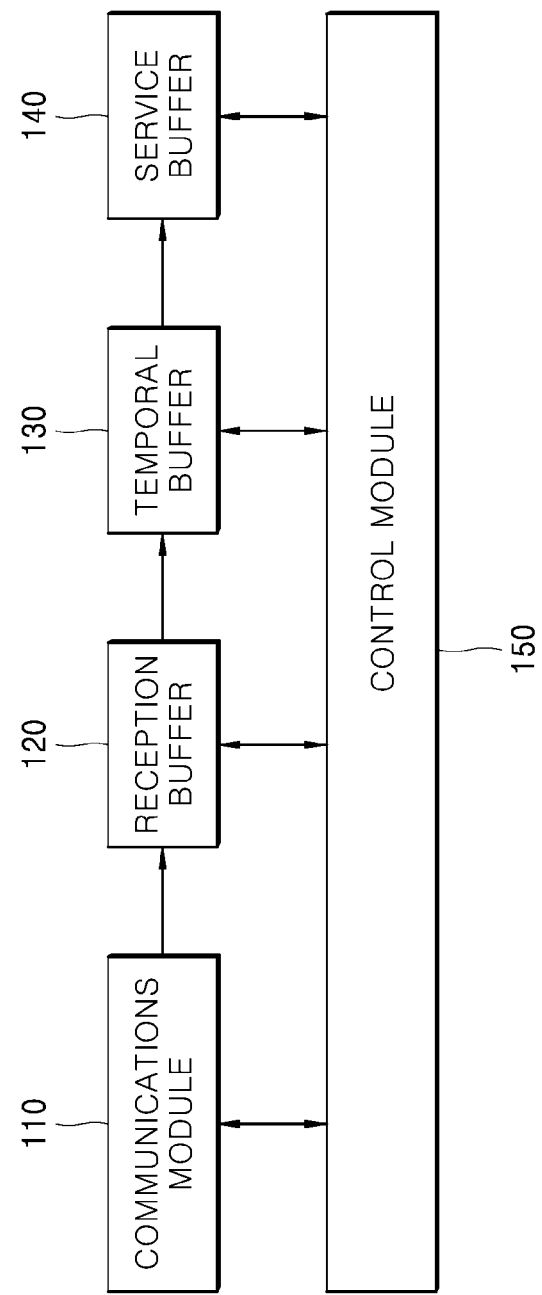
FIG. 3 is a block diagram for illustrating an internal structure of a frame reception monitoring apparatus according to one embodiment of the present disclosure.

FIG. 3 is a block diagram for illustrating an internal structure of a frame reception monitoring apparatus according to one embodiment of the present disclosure.

Referring to FIG. 3, the frame reception monitoring apparatus includes a communications module 110, a reception buffer 120, a temporal buffer 130, a service buffer 140, and a control module 150.

The communications module 110 receives a plurality of sub-frames, which constitutes one frame, at certain time intervals. Thereafter, the control module 150 allows each of the plurality of sub-frames received through the communications module 110 to be entered into the reception buffer 120. The control module 150 assigns timestamps to the sub-frames entered into the reception buffer 120 and then allows the sub-frames to be moved to the temporal buffer 130.

That is, the control module 150 utilizes time information at reception complete time points of the respective sub-frames entered into the reception buffer 120, to assign a timestamp to a corresponding sub-frame and then allows the sub-frame to be moved to the temporal buffer 120.

The reason of assigning the timestamps to the sub-frames as described above is to utilize the timestamps assigned to the sub-frames to calculate interval information between reception times of the sub-frames, thereby determining an inter-sub-frames time-out time. That is, the inter-sub-frames time-out time is previously determined in order to recognize the first sub-frame to any sub-frames received across certain time points as one frame.

The control module 150 allows the plurality of sub-frames stored on the temporal buffer 130 to be entered into the service buffer 140 within a predetermined inter-sub-frames time-out time.

At this time, the reason of previously determining the inter-sub-frames time-out time is to determine a time point when sub-frames transmitted from the transmission terminal can be recognized to be one frame.

Accordingly, the present disclosure can utilize the predetermined inter-sub-frames time-out time to recognize sub-frames stored on the temporal buffer during a specified time period to be one frame.

However, setting the inter-sub-frames time-out time to be too short may cause the predetermined inter-sub-frames time-out time to expire before all of the sub-frames constituting the one frame are stored on the temporal buffer through the reception buffer.

On the contrary, setting the predetermined inter-sub-frames time-out time to be too long may cause all of the sub-frames constituting the one frame to pass through the reception buffer and then be stored on the temporal buffer. However, because the predetermined inter-sub-frames time-out time does not expire yet, this has a problem that it should wait until the predetermined inter-sub-frames time-out time expires.

Therefore, the present disclosure can utilize interval information between reception times of a plurality of sub-frames constituting one frame to previously determine the inter-sub-frames time-out time, thereby preventing the mentioned-above problem.

To do so, the control module 150 utilizes time information at a reception complete time point, which is determined based on a timestamp of a current sub-frame, of a previous sub-frame, a length of the current frame, and a communication rate to calculate time information at a reception start time point of the current sub-frame.

Then, the control module 150 may utilize the time information at the reception complete time point, which is determined based on a timestamp of the previous sub-frame, of the previous sub-frame and the time information at the reception start time point of the current sub-frame as determined by the described-above process, thereby calculating interval information between reception times of the previous sub-frame and the current sub-frame.

Time intervals between a plurality of sub-frames may be known by repeatedly performing the foregoing process. Further, combination of sub-frames can be controlled by utilizing such interval information to determine an inter-sub-frames time-out time, so that the smooth communication with any types of serial communications instruments can be achieved.

The control module 150 utilizes a plurality of sub-frames entered into the service buffer to generate the combined frame, and checks whether the combined frame is identical to the subject frame meant to be received.

Figure 4:
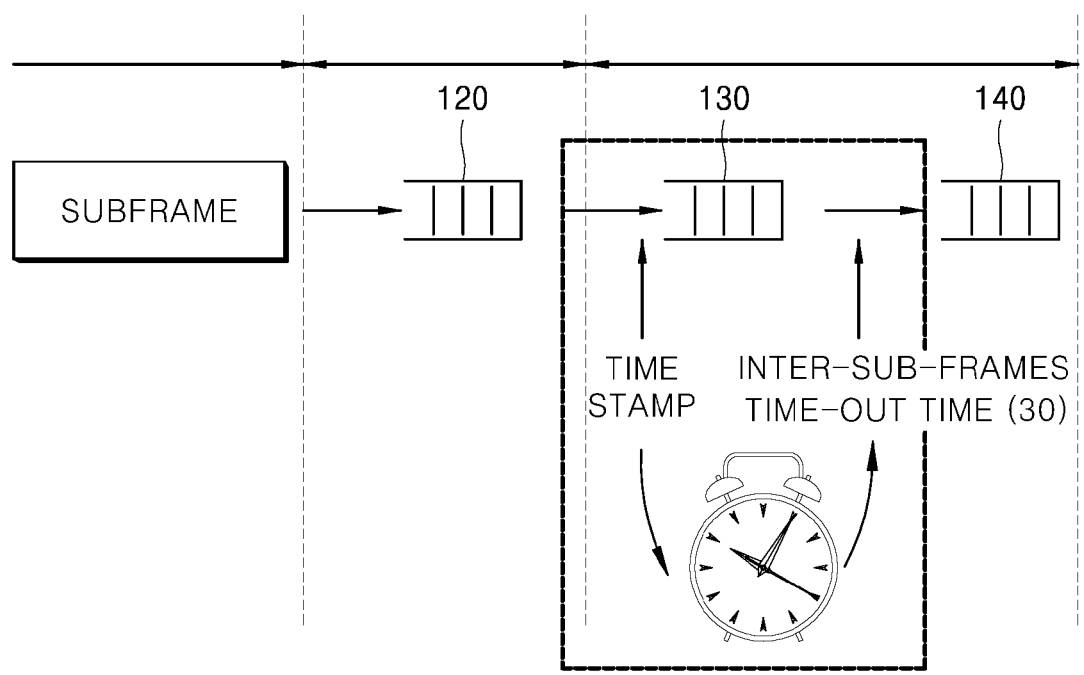
FIG. 4 is a diagram for illustrating a frame reception monitoring process according to one embodiment of the present disclosure.

FIG. 4 is a diagram for illustrating a frame reception monitoring process according to one embodiment of the present disclosure.

Referring to FIGS. 3 and 4, the frame reception monitoring apparatus sequentially receives a plurality of sub-frames, which constitutes one frame, through the communications module 110 to allow them to be entered into the reception buffer 120. The frame reception monitoring apparatus allows the sub-frames entered into the reception buffer 120 to be moved to the temporal buffer 130.

At this time, the frame reception monitoring apparatus assigns timestamps to the sub-frames and then stores the sub-frames on the temporal buffer 130 when storing the sub-frames received into the reception buffer 120 on the temporal buffer 130.

The reason of assigning the timestamps to the sub-frames as described above is to utilize the timestamps assigned to the sub-frames to calculate interval information between reception times of the sub-frames, thereby determining an inter-sub-frames time-out time.

That is, combination of sub-frames can be controlled by utilizing the interval information between reception times of a plurality of sub-frames to previously determine an inter-sub-frames time-out time 30, so that the smooth communication with any types of serial communications instruments can be achieved.

The control module 150 allows the plurality of sub-frames stored on the temporal buffer 130 to be entered into the service buffer 140 during the predetermined inter-sub-frames time-out time 30. Then, the control module 150 utilizes the plurality of sub-frames entered into the service buffer 140 to generate the combined frame, and executes the control by using the combined frame when the combined frame is identical to the subject frame meant to be received.

Figure 5:
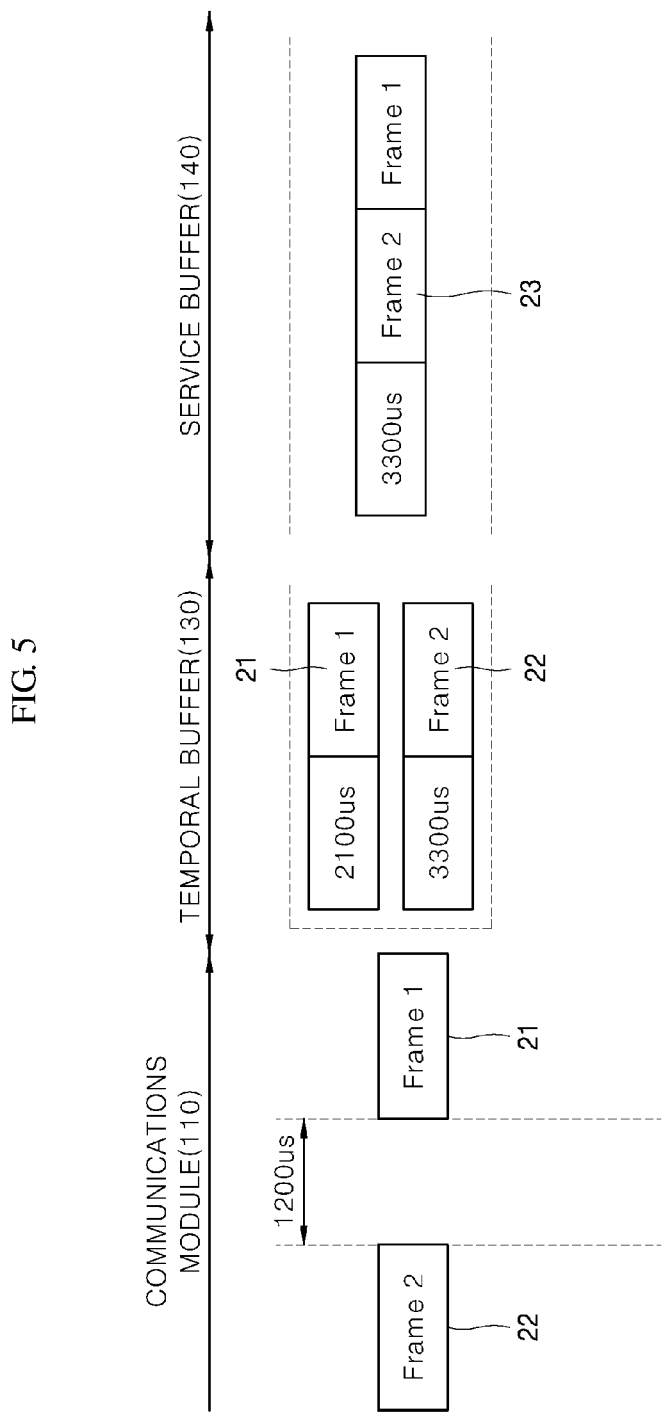
FIG. 5 is a diagram for illustrating the frame reception monitoring process of FIG. 4 in more detail.

FIG. 5 is a diagram for illustrating the frame reception monitoring process of FIG. 4 in more detail.

Referring to FIGS. 3 and 5, the frame reception monitoring apparatus receives a first sub-frame 21, which constitutes a portion of one frame, through the communications module 110. The frame reception monitoring apparatus allows the received first sub-frame 21 to be entered into the reception buffer 120 and then the first sub-frame 21 entered into the reception buffer 120 to be stored on the temporal buffer 130.

At this time, the frame reception monitoring apparatus utilize time information at a reception complete time point of the first sub-frame 21 to assign a timestamp to the first sub-frame 21 and then allows the first sub-frame 21 to be stored on the temporal buffer 130 when storing the first sub-frame 21 received into the reception buffer 120 on the temporal buffer 130. As in FIG. 5, it may utilize time information 2100 µs at the reception complete time point of the first sub-frame 21 to assign a timestamp 2100 µs to the first sub-frame 21.

Then, the frame reception monitoring apparatus receives a second sub-frame 22, which constitutes a portion of one frame, through the communications module 110. The frame reception monitoring apparatus allows the second received sub-frame 22 to be entered into the reception buffer 120 and then the second sub-frame 22 entered into the reception buffer 120 to be stored on the temporal buffer 130.

At this time, the frame reception monitoring apparatus utilizes time information at a reception complete time point of the second sub-frame 22 to assign a timestamp to the second sub-frame 22 and then allows the second sub-frame 22 to be stored on the temporal buffer 130 when storing the second sub-frame 22 received into the reception buffer 120 on the temporal buffer 130. As in FIG. 5, it may utilize time information 3100 µs at the reception complete time point of the second sub-frame 22 to assign a timestamp 3100 µs to the second sub-frame 22.

Then, the frame reception monitoring apparatus allows the first sub-frame 21 and the second sub-frame 22 stored on the temporal buffer to be entered into the service buffer 140 within a predetermined inter-sub-frames time-out time 2000 µs. The service buffer 140 may use the first sub-frame 21 and the second sub-frame 22 to generate a combined frame 23.

The present disclosure utilizes the respective timestamps of the first sub-frame 21 and the second sub-frame 22 to calculate interval information between reception times of the first sub-frame 21 and the second sub-frame 22. Then, the present disclosure may utilize the calculated interval information to determine an inter-sub-frames time-out time.

However, in order to calculate interval information between reception times of a plurality of sub-frames, time information at the respective reception start time points of the plurality of sub-frames should be known. Nonetheless, timestamps assigned to the respective sub-frames indicate only reception complete time points of the sub-frames.

Therefore, the present disclosure traces back and calculates time information at a reception start time point of a current frame. Next, it may utilize the time information at the reception complete time point, which is determined based on a timestamp of a previous sub-frame, of the previous sub-frame and the time information at the reception start time point of the current sub-frame, thereby calculating interval information between reception times of the previous sub-frame and the current sub-frame. Hereinafter, the foregoing process will be described in more detail with reference to FIG. 6.

Figure 6:
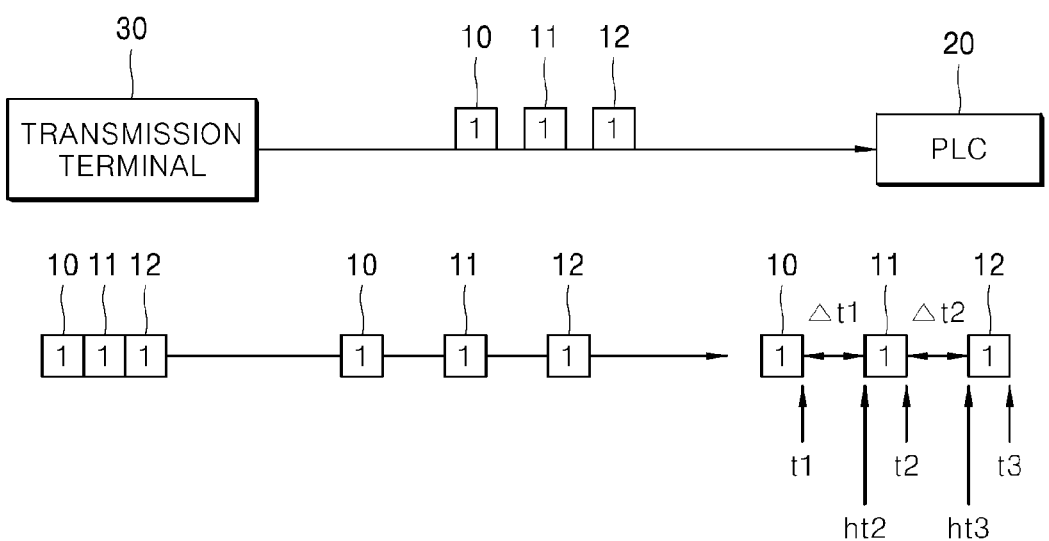
FIG. 6 is a diagram for illustrating a process of calculating interval information between reception times of sub-frames.

FIG. 6 is a diagram for illustrating a process of calculating interval information between reception times of sub-frames.

Referring to FIG. 6, the frame reception monitoring apparatus utilizes time information at a reception complete time point of a first sub-frame 10 of the plurality of sub-frames 10, 11 and 12 and time information at a reception start time point of a second sub-frame 11 of the plurality of sub-frames to calculate interval information between reception times of the first sub-frame 10 and the second sub-frame 11.

At this time, the frame reception monitoring apparatus utilizes a timestamp of the first sub-frame 10 to determine time information at the reception complete time point of the first sub-frame 10. Further, the frame reception monitoring apparatus calculates the time information at the reception start time point of the second sub-frame 11 by using the following Equation 1:

$$HT \approx T - \left(\frac{1}{\text{COMMUNICATION RATE}}\right) \times$$ [Equation 1]

$$(1 + \text{DATA BIT} + \text{PARITY BIT} + \text{STOP BIT}) \times$$

$$\text{FRAME LENGTH}$$

HT: Time information at a reception complete time point of a first bit of a second or more sub-frame according to a communication rate T: Time information at a reception complete time point of a corresponding sub-frame determined based on a timestamp assigned to a corresponding the sub-frame The frame reception monitoring apparatus may substitute time information t2 at a reception complete time point of the second sub-frame 11 as determined based on the timestamp of the second sub-frame 11, a communication rate, and a length of the second sub-frame 11 for the Equation 1 to calculate a reception start time point ht2 of the second sub-frame 11.

Then, the frame reception monitoring apparatus may utilize the time information t1 at the reception complete time point of the first sub-frame 10 and the time information ht2 at the reception start time point of the second sub-frame 11 as determined by Equation 1, thereby calculating interval information between reception times of the first sub-frame 10 and the current sub-frame.

Further, the frame reception monitoring apparatus utilizes time information at a reception complete time point of a second sub-frame 11 of the plurality of sub-frames 10, 11 and 12 and time information at a reception start time point of a third sub-frame 12 of the plurality of sub-frames to calculate interval information between reception times of the second sub-frame 11 and the third sub-frame 12.

At this time, the frame reception monitoring apparatus utilizes a timestamp of the second sub-frame 11 to determine time information at the reception complete time point of the second sub-frame 11. Further, the frame reception monitoring apparatus calculates the time information at the reception start time point of the third sub-frame 12 by using the above Equation 1.

That is, by using the above Equation 1 similarly as the process of determining the time information at the reception start time point of the second sub-frame 11, time information ht3 at a reception start time point of the third sub-frame 12 can be calculated.

Then, the frame reception monitoring apparatus may utilize the time information t2 at the reception complete time point of the second sub-frame 11 and the time information ht3 at the reception start time point of the third sub-frame 12 as determined by Equation 1, thereby calculating interval information t2 between reception times of the second sub-frame 11 and the third sub-frame 12.

Figure 7:
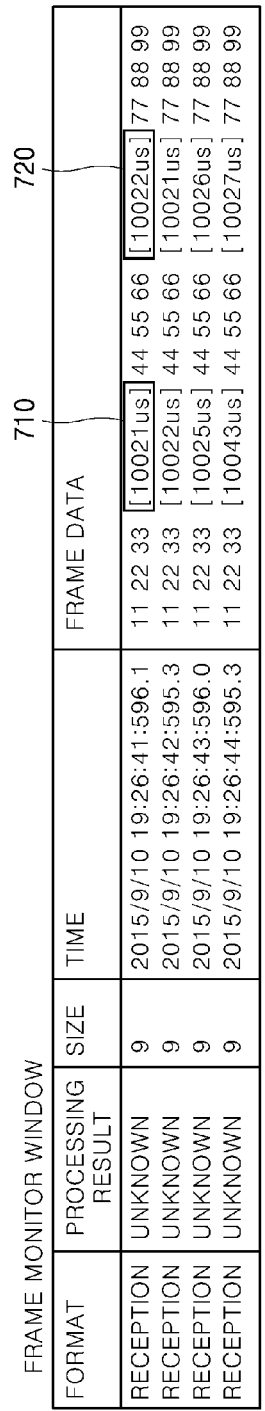
FIG. 7 is an exemplary view displaying interval information between reception times of a plurality of sub-frames on a frame monitor.

FIG. 7 is an exemplary view displaying interval information between reception times of a plurality of sub-frames on a frame monitor.

Referring to FIG. 7, a plurality of sub-frames constituting one frame is each received into the reception buffer at certain time intervals and then the frame reception monitoring apparatus assigns timestamps to the sub-frames when allowing the sub-frames entered into the reception buffer to be stored on the temporal buffer and thereafter allows the sub-frames to be stored on the temporal buffer.

Then, the frame reception monitoring apparatus displays the timestamps assigned to the sub-frames on an application such as a frame monitor. Accordingly, a user can advantageously confirm that serial communications are exactly operated pursuant to an inter-sub-frames timeout time that he/she has set.

For example, the user may learn that time information at a reception complete time point of sub-frames 11 22 33 is 10021 µs by using a timestamp 10021 µs, as denoted by 710, of the sub-frames 11 22 33. Further, the user may learn that time information at a reception complete time point of sub-frames 44 55 66 is 10022 µs by using a timestamp 10022 µs, as denoted by 720, of the sub-frames 44 55 66.

Figure 8:
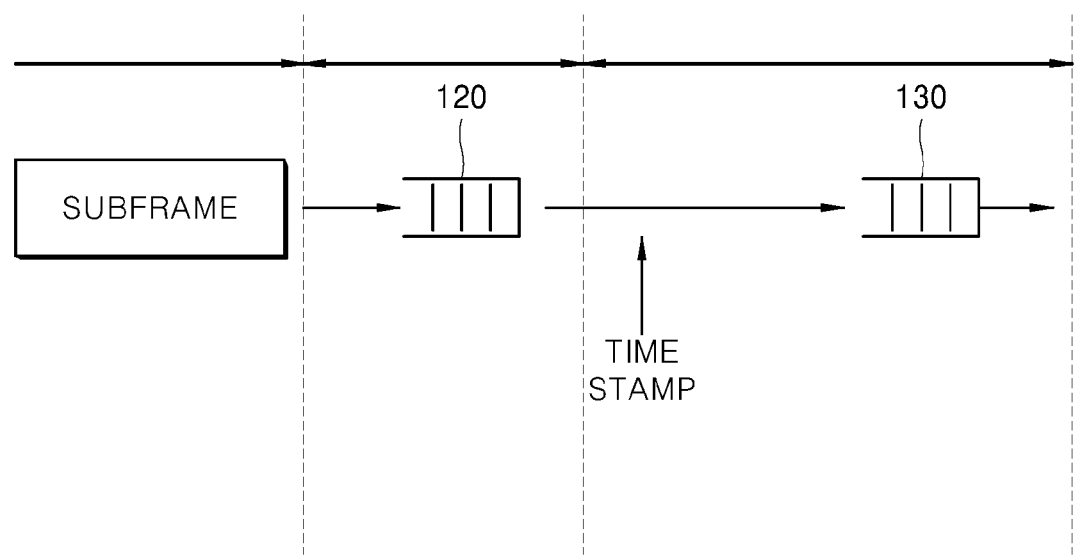
FIG. 8 is a diagram for illustrating the frame reception monitoring process based on a predetermined inter-sub-frames timeout time.

FIG. 8 is a diagram for illustrating the frame reception monitoring process based on a predetermined inter-sub-frames timeout time. On embodiment of FIG. 8 relates to an embodiment in which a frame reception can be monitored when an inter-sub-frames timeout time has been set to be 0.

Referring to FIG. 8, the frame reception monitoring apparatus receives a plurality of sub-frames constituting one frame through the communication module at certain time intervals. The frame reception monitoring apparatus allows the plurality of sub-frames to be respectively entered into the reception buffer 120.

However, the frame reception monitoring apparatus assigns timestamps to the sub-frames entered into the reception buffer 120 and thereafter directly provides them to the service buffer 140 without passing through the temporal buffer 130 (FIG. 2) because the inter-sub-frames timeout time has been set to be 0.

For example, the frame reception monitoring apparatus receives a first sub-frame of the plurality of sub-frames constituting one frame through the communication module and allows it to be entered into the reception buffer 120. And, the frame reception monitoring apparatus assigns a timestamp to the first sub-frame entered into the reception buffer 120 and thereafter directly provides it to the service buffer 140 without passing through the temporal buffer 130.

As described above, the present disclosure assigns timestamps to sub-frames received by a transmission terminal at certain time intervals and stores them, so that interval information between reception times of the sub-frames can be advantageously calculated using a timestamp of a corresponding sub-frame.

Further, the present disclosure can control intervals between sub-frames, which would be recognized to be one frame, according to interval information between reception times of the sub-frames, calculated using the timestamps of the sub-frames, to control a combination of the sub-frames, and therefore, can advantageously be in a smooth communication with any types of serial communications instruments.

The present disclosure described above may be variously substituted, altered, and modified by those skilled in the art to which the present invention pertains without departing from the scope and spirit of the present disclosure. Therefore, the present disclosure is not limited to the above-mentioned exemplary embodiments and the accompanying drawings.

What is claimed is:

1. A frame reception monitoring method in serial communications, the method comprising:
   when a plurality of sub-frames constituting a frame is each entered into a reception buffer at certain time intervals, assigning timestamps to the plurality of sub-frames respectively, and allowing the respective sub-frames to be stored on a temporal buffer;
   allowing the plurality of sub-frames stored on the temporal buffer to be entered into a service buffer within a predetermined inter-sub-frames time-out time;

using the plurality of sub-frames entered into the service buffer to generate a combined frame; and using the combined frame to execute a control.

2. The method according to claim 1, wherein assigning timestamps to the sub-frames and then allowing the sub-frames to be stored on the temporal buffer includes utilizing time information at a reception complete time point of each of the sub-frames to assign a timestamp to a corresponding sub-frame when the plurality of sub-frames is each entered into the reception buffer.

3. The method according to claim 1, further comprising:
utilizing the timestamps respectively assigned to the sub-frames to calculate interval information between reception times of the sub-frames.

4. The method according to claim 3, wherein utilizing the timestamps respectively assigned to the sub-frames to calculate interval information between reception times of the sub-frames includes utilizing time information at a reception complete time point of a first sub-frame of the plurality of sub-frames and time information at a reception start time point of a second sub-frame of the plurality of sub-frames to calculate interval information between reception times of the first sub-frame and the second sub-frame.

5. The method according to claim 4, wherein calculating interval information between reception times of the first sub-frame and the second sub-frame includes utilizing a timestamp of the first sub-frame to determine time information at the reception complete time point of the first sub-frame.

6. The method according to claim 4, wherein calculating interval information between reception times of the first sub-frame and the second sub-frame includes:
utilizing a timestamp of the second sub-frame to determine time information at a reception complete time point of the second sub-frame; and
utilizing the time information at the reception complete time point of the second sub-frame, a length of the second sub-frame, and a communication state to calculate time information at the reception start time point of the second sub-frame.

7. The method according to claim 3, further comprising:
utilizing the interval information between reception times of the plurality of sub-frames to determine the inter-sub-frames time-out time.

8. The method according to claim 1, wherein using the combined frame to execute a control includes:
determining whether the combined frame is identical to a subject frame meant to be received;
if it is determined that the combined frame is identical to the subject frame, executing the control using the combined frame; and
if it is determined that the combined frame is not identical to the subject frame, deleting the combined frame.

9. The method according to claim 1, wherein the frame reception monitoring method is executed in a UART controller in serial communications.

* * * * *